3,315,012
SELF-CURING SYNTHETIC POLYMER BLENDS
August H. Jorgensen, Jr., Philip H. Starmer, and James F. Stuesse, Avon Lake, Ohio, assignors to The B. F. Goodrich Company, New York, N.Y., a corporation of New York
No Drawing. Filed June 4, 1962, Ser. No. 199,638
8 Claims. (Cl. 260—851)

This invention relates to heat curable blends of acrylate interpolymers and more particularly pertains to novel heat curable blends of acrylic ester interpolymers containing N-alkylol amide groups and acrylic ester interpolymers containing amide groups and to a method for preparing same.

Acrylate rubbers are well known in the art. In the past, numerous methods have been employed for the vulcanization of elastomeric acrylate ester polymers. The usual agents employed for the vulcanization of natural rubber and the synthetic diene rubbers, such as the SBR and NBR types, are sulfur or sulfur-supplying organic compounds. In the case of the polyacrylates which are completely saturated, however, it has been necessary to find new types of vulcanization agents and it has been found that curing sites must be incorporated into the polymer for best results. It is known that vulcanized acrylate rubbers do possess certain superior physical and chemical properties such as good low temperature flexibility, ozone and oil resistance. Much of the state of the acrylate rubber prior art is described more completely in "Industrial and Engineering Chemistry," vol. 38, No. 9, pages 960–967 (1946) and in "Rubber Age," March 1951, pages 699–700 and 706.

The compositions embodied herein may be cured without the use of any curing agent, yet they have long shelf lives in the uncured state and are superior to other acrylate rubbers in this respect. The curable compositions embodied herein process very easily on the mill and the present process eliminates the necessity for the handling of toxic, odorous curing agents which are usually employed in rubber compounding. The cured compositions of the present invention have exceptionally good water resistance, oil resistance and low temperature flexibility. The cured compositions embodied herein resist corrosion in the presence of metals which is unlike the behavior of most of the prior art acrylate vulcanizates.

The novel heat curable polymeric compositions of this invention are polymeric mixtures which are comprised of the essential ingredients of (1) an interpolymer of a monomer mixture comprising a lower acrylic ester and an olefinically unsaturated N-alkylol amide copolymerizable with said acrylic ester and (2) an interpolymer of a monomer mixture comprising a lower acrylic ester and an olefinically unsaturated amide containing at least one hydrogen on the amide nitrogen.

The lower acrylic esters embodied in the curable polymeric mixtures of this invention are those having the structure

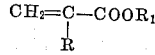

wherein R is a member of the class consisting of hydrogen and an alkyl group having from 1 to 4 carbon atoms and $R_1$ is a member of the class consisting of alkyl groups having from 1 to 8 carbon atoms and cyano alkyl groups having from 2 to 8 carbon atoms. Representative lower alkyl acrylic esters are methyl acrylate, ethyl acrylate, the propyl acrylates, the butyl acrylates, the amyl acrylates, the hexyl acrylates, cyclohexyl acrylate, the heptyl acrylates, and the octyl acrylates; the cyanoalkyl acrylates such as alpha-cyano methyl acrylate having the structure $CH_2=CH-COOCH_2CN$, alpha-cyano ethyl acrylate having the structure

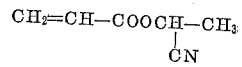

beta-cyano ethyl acrylate having the structure $$CH_2=CH-COOCH_2CH_2CN$$

the alpha, beta and gamma-cyano propyl acrylates, the cyanobutyl acrylates, the cyanoamyl acrylates, the cyanohexyl acrylates and the cyanoheptyl acrylates; alkyl methacrylates such as methyl methacrylate, ethyl methacrylate, the propyl methacrylates, the butyl methacrylates, the amyl methacrylates, the hexyl methacrylates, cyclohexyl methacrylate, the heptyl methacrylates, and the octyl methacrylates; cyanoalkyl acrylates such as alpha-cyanomethyl methacrylate, alpha-cyanoethyl methacrylate, beta-cyanothyl methacrylate, the cyanopropyl methacrylates, the dicyanopropyl methacrylates, the cyanobutyl methacrylates, the cyanocyclohexyl methacrylates, the cyanoheptyl methacrylates and the like and others. Most preferred in the present invention are the alkyl and cyanoalkyl acrylic esters in which the alkyl group contains from 1 to 4 carbon atoms.

The olefinically unsaturated N-alkylol amides embodied herein include such polymerizable monomers as N-methylol acrylamide, N-ethanol acrylamide, N-propanol acrylamide, N-methylol methacrylamide, N-ethanol methacrylamide, N-methylol maleimide, N-methylol maleamide, N-methylol maleamic acid esters, the N-alkylol amides of the vinyl aromatic acids such as N-methylol-p-vinyl benzamide, and the like and others. Also included herein are the alkylol ethers of the foregoing types of N-alkylol amides, an illustration of which is $$CH_2=CHCONHCH_2OA$$

wherein A is an alkyl group having from 1 to 8 carbon atoms. Most preferred are the N-alkylol amides of the following structure

wherein $R_2$ is a member of the group consisting of hydrogen and an alkyl group having from 1 to 4 carbon atoms, $R_3$ is an alkylene group having from 1 to 8 carbon atoms and $R_4$ is a member of the group consisting of hydrogen and an alkyl group having from 1 to 8 carbon atoms.

The polymerizable amides embodied herein include acrylamide, N-methyl acrylamide, N-t-butyl acrylamide, N-cyclohexyl acrylamide, methacrylamide, N-ethyl acrylamide, maleic acid amide, maleic acid diamide, fumaric acid amides, crotonic acid amide, itaconic acid amide, p-vinyl benzamide. Most preferred are amides having the structure

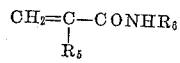

wherein $R_5$ is a member of the group consisting of hydrogen and an alkyl group having from 1 to 4 carbon atoms and $R_6$ is a member of the group consisting of hydrogen and an alkyl group having from 1 to 6 carbon atoms.

In the process of the present invention the component (1), the interpolymer of a lower acrylic ester and an olenfinically unsaturated alkylol amide, is intimately mixed with component (2), the interpolymer of a lower acrylic ester and an olefinically unsaturated amide, by latex blending, by mill mixing, Banbury mixing and by other means known by those skilled in the art. The resulting blend may be cured in a mold at an elevated temperature to produce a vulcanizate which has all the desirable properties of a vulcanized rubber including good tensile, elongation and compression set, in addition to excellent oil resistance, heat aging properties and low temperature flexibility.

The novel polymer blends of this invention are self-curing. Stated differently, it is not necessary and it is preferred not to add any external curing agent to the polymer blends of this invention in order to cause vulcanization. It is within the scope of the present invention to include other customary rubber compounding agents including pigments, fillers, lubricants, dyes and the like in the uncured and cured compositions embodied herein.

The preparation of an interpolymer of a lower acrylic ester, an olefinically unsaturated alkylol amide and an olefinically unsaturated amide having at least one hydrogen or the amide nitrogen results in a composition which is milled and mixed in the customary manner only with difficulty because this composition appears to be somewhat cross-linked during the polymerization step. Although such compositions are useful in many coating and impregnating operations when used in solution or in dispersion in a liquid medium, such compositions, per se, appear to have limited use as rubbers primarily because of their poor heat aging properties. Moreover, when the interpolymer of a lower acrylic ester and an olefinically unsaturated N-alkylol amide is compounded and an attempt is made to cure it by heating, there results an inferior product having low original elongation and being quite unstable to prolonged heat aging. Similarly, when an interpolymer of a lower acrylic ester and an olefinically unsaturated amide having at least one amide hydrogen is compounded and a cure is attempted with heat alone, little or no cure results and the heat treated product maintains most of the same physical properties possessed by the original interpolymer.

The preferred heat curable polymeric compositions of the present invention comprise a mixture of (1) an interpolymer of from 75 to 99.9% by weight of (a) at least one compound having the structure

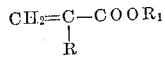

wherein R is a member of the class consisting of hydrogen and an alkyl group having from 1 to 4 carbon atoms, $R_1$ is a member of the class consisting of alkyl groups having from 1 to 8 carbon atoms and cyano alkyl groups having from 2 to 8 carbon atoms; and from 0.1 to 25% by weight of (b) a compound having the structure

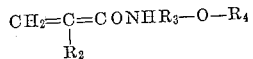

wherein $R_2$ is a member of the group consisting of hydrogen and an alkyl group having from 1 to 4 carbon atoms, $R_3$ is an alkylene group containing from 1 to 8 carbon atoms and $R_4$ is a member of the group consisting of hydrogen and an alkyl group having from 1 to 8 carbon atoms; and (2) an interpolymer of from 75 to 99.9% by weight of (a) at least one compound having the structure

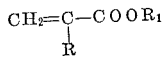

wherein R is a member of the class consisting of hydrogen and an alkyl group having from 1 to 4 carbon atoms and $R_1$ is a member of the class consisting of alkyl groups having from 1 to 8 carbon atoms and cyano alkyl groups having from 2 to 8 carbon atoms; and from 0.1 to 25% by weight of (b) a compound having the structure

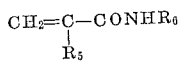

wherein $R_5$ is a member of the group consisting of hydrogen and an alkyl group having from 1 to 4 carbon atoms and $R_6$ is a member of the group consisting of hydrogen and an alkyl group having from 1 to 6 carbon atoms. In the foregoing blends the weight proportions of components (1) and (2) may be varied from 1:10 to 10:1, respectively.

It has also been found to be advantageous to include in the polymer blends of this invention from about 0.1 to 5 parts by weight per 100 parts by weight of polymer of a polyalkylene glycol. The heat aging properties of vulcanizates containing such polyalkylene glycols are superior to those observed for vulcanizates not containing the polyalkylene glycols. Polyalkylene glycols useful herein include polymethylene oxide glycol, polyethylene oxide glycol, polypropylene oxide glycol, polytetramethylene oxide glycol and generally glycols having the structure

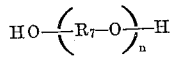

wherein $R_7$ is an alkylene group having from 1 to 8 carbon atoms and $n$ is a whole number greater than 1. A more detailed description of the more common polyalkylene glycols is given in "Encyclopedia of Chemical Technology" by Kirk and Othmer, Interscience Encyclopedia, Inc., New York, volume 7, particularly pages 257–263.

It is preferred that the individual interpolymers of this invention be prepared in latex form and that the latices be blended prior to the polymer coagulation step. When latex blending is done it is also preferred that the individual interpolymers be prepared in latex form using emulsifier and stabilizer systems which are compatible so that the latices will not begin to coagulate on mixing. That is to say, the emulsifier and other agents present in the individual interpolymer latices should be compatible with each other, and preferably should be of a single type such as anionic, cationic or non-ionic. The proper choice and use of such agents is well known to those skilled in the art of latex polymerization, and while it is generally preferred that the emulsifier used be of an anionic nature, it is also within the scope of this invention to use a cationic emulsifier, or mixtures of either an anionic or cationic emulsifier with added emulsifier of non-ionic character.

In the following examples which will serve to illustrate the present invention the amounts of ingredients are expressed as parts by weight unless otherwise indicated.

EXAMPLE I

Polymers were prepared using the following recipe:

| | |
|---|---|
| Water | 200 |
| Sodium dodecyl benzene sulfonate | 1.5 |
| Sodium naphthalene sulfonate | 0.3 |
| $Na_2S_2O_4$ | 0.05 |
| Ammonium persulfate | 0.2 |
| Monomers | 100.0 |

The first four ingredients were batch charged into a reactor, the temperature was brought to about 50° C., air was swept from the system with an inert gas such as nitrogen or carbon dioxide and the ammonium persulfate catalyst was added. The mixed monomers were added slowly to the reaction mixture over a period of about 4 hours during which time the temperature was maintained at about 50° C. There resulted a latex of the desired polymer composition.

In an alternate procedure to the foregoing only part of the water and all of the catalyst was charged in the reactor initially and an aqueous emulsion of the surface active agents and monomers in the remaining water was added slowly to the polymerization mixture over a period of about 4 hours under the same reaction conditions.

In the foregoing manner polymers having the following compositions were prepared:

| | A | B |
|---|---|---|
| Ethyl acrylate | 97.2 | 96.5 |
| N-methylol acrylamide | 2.8 | |
| Acrylamide | | 3.5 |

A terpolymer (C) of ethyl acrylate, N-methylol acrylamide and acrylamide containing 97% ethyl acrylate and 3% of combined N-methylol acrylamide and acrylamide wherein the mole ratio of N-methylol acrylamide to acrylamide was 1.4:1 and a fourth composition (D), a latex blend of polymer A and polymer B to give on the average the composition:

| | D |
|---|---|
| Ethyl acrylate | 97.0 |
| N-methylol acrylamide plus acrylamide | 3.0 |
| Mole ratio N-methylol acrylamide:acrylamide | 1.5:1 | was also prepared. The polymeric mixture (D) is exemplary of the compositions of this invention. Each of the polymers A through D was coagulated by passing the latex into an aqueous solution of NaCl. (Methanol also could be used.) The polymers were dried and then each polymer was compounded by mill mixing using the following recipe:

| | |
|---|---|
| Polymer | 100 |
| FEF black | 40 |
| Stearic acid | 1.0 |

The resulting stocks after being cured at 310° F. for 30 minutes and tempered at 300° F. for 24 hours were found to have the following physical properties:

| | A | B | C | D |
|---|---|---|---|---|
| Tensile, p.s.i. | 1,500 | 750 | 1,750 | 1,550 |
| Elongation, percent | 190 | 710 | 350 | 310 |
| Durometer A hardness | 71 | 60 | 60 | 63 |
| Compression set | 29 | 32 | 33 | 27 |

(cured 45 min. at 310° F., tempered 24 hours, at 300° F.).

The foregoing vulcanizates after aging for 70 hours in air at 350° F. were found to have the following physical properties:

| | A | B | C | D |
|---|---|---|---|---|
| Tensile, p.s.i. | 550 | 300 | 200 | 550 |
| Tensile change, percent | −63 | −60 | −89 | −65 |
| Elongation, percent | 350 | 610 | 800 | 450 |
| Elongation change, percent | +84 | −14 | +129 | +45 |

EXAMPLE II

In a manner similar to that set forth in Example I a series of blends of (1) ethyl acrylate-N-methylol acrylamide copolymer and (2) ethylacrylate-acrylamide copolymer were prepared which had the following compositions:

| | A | B | C | D | E | F |
|---|---|---|---|---|---|---|
| Ethyl acrylate | 97→ | | | | | 97.2 |
| N-methylol acrylamide plus acrylamide | 3→ | | | | | |
| Mole ratio N-methylol acrylamide:acrylamide | 1.5:1 | 1.5:1 | 1.5:1 | 1:1 | 2:1 | |
| N-methylol acrylamide only | | | | | | 2.8 |

The foregoing polymers were compounded with carbon black, stearic acid as shown in Example I and also the following amount of a polyethylene glycol (Carbowax 4000 marketed by the Carbide and Carbon Chemicals Company) having a molecular weight of about 4,000.

| | A | B | C | D | E | F |
|---|---|---|---|---|---|---|
| Carbowax 4000 | 0.5 | 2.0 | 5.0 | 2.0 | 2.0 | 2.0 |

Vulcanizates cured at 310° F. for 30 minutes and tempered at 300° F. for 24 hours had the following properties:

| | A | B | C | D | E | F |
|---|---|---|---|---|---|---|
| Tensile, p.s.i. | 1,500 | 1,400 | 1,250 | 1,550 | 1,500 | Scorched. Couldn't be molded. |
| Elongation, percent | 280 | 310 | 310 | 300 | 250 | |
| Hardness, Durometer A | 65 | 60 | 63 | 62 | 63 | Do. |
| Compression set, percent | 28 | 27 | 30 | 24 | 26 | Do. |

AGED 70 HOURS AT 350 °F. IN AIR

| | A | B | C | D | E |
|---|---|---|---|---|---|
| Tensile, p.s.i. | 700 | 1,000 | 1,300 | 1,100 | 1,200 |
| Tensile change, percent | −35 | −29 | +4 | −29 | −20 |
| Elongation, percent | 400 | 350 | 390 | 330 | 290 |
| Elongation change, percent | +43 | +13 | +26 | +10 | +16 |

EXAMPLE III

A latex blend (A) of (1) a terpolymer of 91% ethyl acrylate, 6% n-butyl acrylate and 3% N-methylol acrylamide and (2) a terpolymer of 91% ethyl acrylate, 6% n-butyl acrylate and 3% acrylamide wherein the mole ratio of N-methylol acrylamide to acrylamide was 1.5:1 was prepared by the procedure described in Example I. A tetrapolymer (B) of 90% ethyl acrylate, 6% n-butyl acrylate and 4% of combined N-methylol acrylamide and acrylamide present in the mole ratio of 1.4:1 respectively was also prepared as described in Example I. Polymers A and B were coagulated, dried, compounded and vulcanized as described in Example I with the following results:

| | A | B |
|---|---|---|
| Tensile, p.s.i. | 1,650 | 1,500 |
| Elongation, percent | 180 | 300 |
| Hardness, Durometer A | 64 | 60 |
| Compression set, percent | 26 | 33 |

After aging 70 hours at 350° F. in air, the mixture (A) of copolymers prepared according to this invention had a much greater tensile than the tetrapolymer (B):

| | A | B |
|---|---|---|
| Tensile, p.s.i. | 800 | 450 |
| Tensile, change, percent | −51 | −68 |
| Hardness | 64 | 63 |
| Hardness change, percent | 0 | +3 |

EXAMPLE IV

The following interpolymers were prepared by the procedure given in Example I. B-F are blends.

| | A | B | C | D | E | F |
|---|---|---|---|---|---|---|
| n-Butyl acrylate | 85 | 82 | 82 | 80 | 80 | 86 |
| 2-cyanoethyl acrylate | 15 | 15 | 15 | 17 | 16 | |
| Acrylonitrile | | | | | | 10 |
| (N-Methylol acrylamide+ acrylamide) | | 3 | 3 | 3 | 4 | 4 |
| Mole ratio, N-methylol acrylamide:acrylamide | | 0.85:1 | 1.4:1 | 1.2:1 | 1.4:1 | 1.4:1 |

The polymers were coagulated, dried and polymers B-F were compounded with carbon black and stearic acid as described in Example I. Polymer A was compounded with carbon black, stearic acid in the usual manner and 6 parts of dicumyl peroxide were included also. The stocks were cured for 30 min. at 310° F. and tempered at 300° F. for 24 hours and their physical properties were then determined.

|  | A | B | C | D | E | F |
|---|---|---|---|---|---|---|
| Tensile, p.s.i | 950 | 950 | 1,060 | 1,050 | 1,200 | 950 |
| Elongation, Percent | 260 | 390 | 310 | 310 | 230 | 960 |
| Hardness, Durometer A | 40 | 53 | 58 | 50 | 58 | 59 |

AGED 70 HOURS IN AIR AT 350°F.

|  |  |  |  |  |  |  |
|---|---|---|---|---|---|---|
| Tensile, p.s.i | 500 | 850 | 750 | 900 | 1,050 | 850 |
| Tensile change, percent | −47 | −11 | −21 | −14 | −13 | −11 |
| Elongation, percent | 80 | 220 | 140 | 180 | 170 | 350 |
| Elongation change, percent | −69 | −44 | −55 | −42 | −26 | −38 |
| Hardness | 64 | 58 | 65 | 62 | 65 | 61 |
| Hardness change, percent | +24 | +5 | +7 | +12 | +7 | +2 |

EXAMPLE V

Interpolymers of (a) 86% ethyl acrylate, 10% n-butyl acrylate, 4% n-butoxymethyl acrylamide and (b) 86% ethyl acrylate, 10% n-butyl acrylate and 4% acrylamide were blended to give a product having a ratio of n-butoxymethyl acrylamide:acrylamide of 2.5:1. The blend was cured at 310° F. for 30 minutes as described in the preceding examples. The vulcanizate had a tensile of 1500 p.s.i. and after aging for 70 hours at 350° F. it had a tensile of 1750 p.s.i.

EXAMPLE VI

A latex of an interpolymer of 85% n-butyl acrylate, 12% of 2-cyanoethyl acrylate and 3% acrylamide was blended with a latex of an interpolymer of 85% n-butyl acrylate, 12% of 2-cyanoethyl acrylate and 3% N-methylol acrylamide in the manner described in the preceding examples. The resulting latex blend contained a mole ratio of acrylamide to N-methylol acrylamide of 1:1.

The polymer blend was coagulated, dried and compounded with carbon black and stearic acid as described in Example I. The stock which was cured for 30 minutes at 310° F. and tempered for 24 hours at 300° F. had the following physical properties:

| | |
|---|---|
| Ultimate tensile, p.s.i. | 600 |
| Ultimate elongation, percent | 600 |
| Hardness, Durometer A | 42 |

Low temperature brittleness, ASTM D746:

| | |
|---|---|
| Pass (° F.) | −30 |
| Fail (° F.) | −35 |
| Tb (° F.) | −35 |

70 hrs. at 300° F. in ASTM oil No. 1:

| | |
|---|---|
| Ultimate tensile, p.s.i. | 600 |
| Tensile change, percent | 0 |
| Ultimate elongation, percent | 720 |
| Elongation change, percent | +20 |
| Hardness, Durometer A | 39 |
| Hardness changes (points) | −3 |
| Volume change, percent | +3.3 |

We claim:
1. The heat curable rubber composition comprising a mixture of (1) an interpolymer of from 75 to 99.9% by weight of (a) at least one compound having the structure

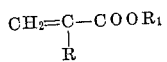

wherein R is a member of the class consisting of hydrogen and an alkyl group having from 1 to 4 carbon atoms and $R_1$ is a member of the class consisting of alkyl groups having from 1 to 8 carbon atoms and cyano alkyl groups having from 2 to 8 carbon atoms and from 0.1 to 25% by weight of (b) a compound having the structure

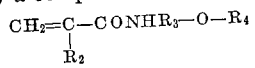

wherein $R_2$ is a member of the group consisting of hydrogen and an alkyl group having from 1 to 4 carbon atoms, $R_3$ is an alkylene group containing from 1 to 8 carbon atoms and $R_4$ is a member of the group consisting of hydrogen and an alkyl group having from 1 to 8 carbon atoms; and (2) an interpolymer of from 75 to 99.9% by weight of (a) at least one compound having the structure

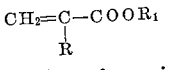

wherein R and $R_1$ have the foregoing designations and from 0.1 to 25% by weight of (b) a compound having the structure

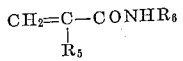

wherein $R_5$ is a member of the group consisting of hydrogen and an alkyl group having from 1 to 4 carbon atoms and $R_6$ is a member of the group consisting of hydrogen and an alkyl group having from 1 to 6 carbon atoms wherein the proportions of components (1) and (2) are present in the weight ratios of from 1:10 to 10:1 respectively.

2. The composition of claim 1 wherein component (1)(a) is ethyl acrylate, component (1)(b) is N-methylol acrylamide, component (2)(a) is ethyl acrylate and component (2)(b) is acrylamide.

3. The composition of claim 1 wherein the component (1)(a) is n-butyl acrylate, component (1)(b) is N-methylol acrylamide, component (2)(a) is n-butyl acrylate, and component (2)(b) is acrylamide.

4. The composition of claim 1 wherein component (1)(a) is a mixture of n-butyl acrylate and 2-cyano ethyl acrylate, component (1)(b) is N-methylol acrylamide, component (2)(a) is a mixture of n-butyl acrylate and 2-cyanoethyl acrylate and component (2)(b) is acrylamide.

5. The cured composition of claim 1.
6. The cured composition of claim 2.
7. The cured composition of claim 3.
8. The cured composition of claim 4.

References Cited by the Examiner

UNITED STATES PATENTS

| | | | |
|---|---|---|---|
| 2,940,950 | 6/1960 | Gusman | 260—851 |
| 3,062,776 | 11/1962 | Gaylord | 260—901 |
| 3,118,852 | 1/1964 | Christenson et al. | 260—855 |

FOREIGN PATENTS 596,750  1/1948  Great Britain.

MURRAY TILLMAN, *Primary Examiner.*

LEON J. BERCOVITZ, *Examiner.*

J. L. WHITE, J. A. KOLASCH, *Assistant Examiners.*